United States Patent [19]
Aoki et al.

[11] Patent Number: 6,012,563
[45] Date of Patent: Jan. 11, 2000

[54] ELECTROMAGNETIC CLUTCH WITH SLIP RING AND BRUSH

[75] Inventors: Yuuichi Aoki, Chita-gun; Hiroyasu Sakamoto, Kariya; Shinichi Fujiyama, Okazaki; Junichi Ohguchi, Toyoake, all of Japan

[73] Assignee: Denso Corporation, Kariya, Japan

[21] Appl. No.: 09/132,643

[22] Filed: Aug. 11, 1998

[30] Foreign Application Priority Data

| Aug. 26, 1997 | [JP] | Japan | 9-229705 |
| Oct. 21, 1997 | [JP] | Japan | 9-288939 |
| Feb. 27, 1998 | [JP] | Japan | 10-047839 |

[51] Int. Cl.[7] ................................ F16D 27/06
[52] U.S. Cl. ............. 192/84.951; 192/84.95; 310/232; 310/248
[58] Field of Search ............ 192/84.95, 84.951; 310/78, 92, 100, 103, 232, 251, 248

[56] References Cited

U.S. PATENT DOCUMENTS

| 880,266 | 2/1908 | Ast | 192/84.961 X |
| 2,606,638 | 8/1952 | Russel | 192/84.951 X |
| 2,751,056 | 6/1956 | Amuller et al. | 192/84.95 X |
| 2,772,762 | 12/1956 | Gamundi et al. | 192/84.95 X |
| 2,897,933 | 8/1959 | Maurice et al. | 192/84.95 X |
| 2,973,850 | 3/1961 | Jaeschke | 192/84.95 X |
| 3,057,447 | 10/1962 | Peras | 192/84.951 X |
| 3,246,725 | 4/1966 | Brashear, Jr. | 192/84.95 X |
| 3,504,773 | 4/1970 | Miller | 192/84.951 X |
| 3,675,747 | 7/1972 | Obermark | 192/84.951 X |
| 4,337,855 | 7/1982 | Bennett | 192/84.94 |
| 4,447,752 | 5/1984 | Boyce et al. | 310/232 |

FOREIGN PATENT DOCUMENTS

| 1-131028 U | 9/1989 | Japan . |
| 2-54928 U | 4/1990 | Japan . |

*Primary Examiner*—Charles A Marmor
*Assistant Examiner*—Ankur Parekh
*Attorney, Agent, or Firm*—Harness, Dickey & Pierce, PLC

[57] ABSTRACT

In order to reduce its size of a coil-rotation type electromagnetic clutch in an axial direction and to prolong the life of its brush, a sliding current supply mechanism, which has slip rings and slidable brushes which contact the slip rings, is located inside an inner circumference of a housing boss of a compressor. The current is supplied to an electromagnetic coil via the sliding current supply mechanism. Since the sliding current supply mechanism is located in the boss, a current supply passage is formed without increasing the size of the clutch in axial direction. Thus the installation of the electromagnetic clutch in the engine room is facilitated. Furthermore, since the sliding current supply mechanism is located near the rotational center of the clutch, the life of the brush is prolonged due to the small peripheral velocity of the brush.

21 Claims, 16 Drawing Sheets

ELECTROMAGNETIC CLUTCH WITH SLIP RING AND BRUSH

CROSS REFERENCE TO RELATED APPLICATIONS

This application is based upon and claims priority from Japanese patent application Nos. Hei 9-229705, filed Aug. 26, 1997, and Hei 9-288939, filed Oct. 21, 1997, and Hei 10-47839, filed Feb. 27, 1998, the entire contents of which are incorporated herein by reference.

BACKGROUND OF THE INVENTION

1. Field of the Invention

The present invention relates to an electromagnetic clutch that cuts and supplies power and that is particularly suitable for driving a compressor in a refrigeration cycle for an automobile air conditioning apparatus.

2. Description of Related Art

One type of known electromagnetic clutch has been generally utilized as a coil-fixed type clutch which has an electromagnetic coil on a fixed member for generating an electromagnetic suction force. This coil-fixed type electromagnetic clutch forms a passage for supplying current to the electromagnetic coil without an additional current supply member, because the electromagnetic coil is installed in the fixed member.

However, a magnetic circuit, through which flux passes, is formed through the fixed member, the rotational member and an armature magnetically attracted by the drive-side rotational member because the electromagnetic coil is installed in the fixed member. Thus, magnetic gaps are formed among these three circuit components. Therefore, the size of the electromagnetic coil may be increased, or it consumes more electricity, due to greater magnetic loss and lower magnetic efficiency.

To solve this problem, a coil-rotation type which includes the electromagnetic coil on the rotational member is proposed in, for example, JP-U-1-131028 and JP-U-2-54928. According to these coil-rotation type, the magnetic circuit comprises only the rotational member and the armature magnetically attracted by the rotational member. Therefore, such coil-rotation type has an advantage because the magnetic loss is much smaller and its magnetic efficiency is much higher than the coil-fixed type.

However, according to the electromagnetic clutch disclosed in JP-U-1-131028, a size in the axial direction of the electromagnetic clutch is large. Also, installation of the electromagnetic clutch in small installation areas such as an automotive engine room is difficult because the current supply members that supply current to the rotating electromagnetic coil, such as a slip ring and a brush, are located on an outer axial portion of the electromagnetic coil. Furthermore, the life of the brush is short because the brush is mounted at a location where the distance from the rotational center of the electromagnetic clutch is comparably large, and the peripheral velocity of the brush is large.

According to the electromagnetic clutch disclosed in JP-U-2-54928, a size in the axial direction of the electromagnetic clutch is also large because the current supply members, such as a slip ring and a brush, are located on an outer axial portion of a slave device drive shaft, such as a compressor.

SUMMARY OF THE INVENTION

The present invention is made in light of the foregoing problem, and it is an object of the present invention to provide an electromagnetic clutch which is reduced in size in the axial direction and which is designed to prolong brush life.

According to the electromagnetic clutch of the present invention, a rotating member is rotated by a rotational force. An electromagnetic coil is mounted on the rotating member and generates an electromagnetic attractive force when a current is supplied thereto. An armature is coupled with the rotating member in response to the electromagnetic attractive force generated by the electromagnetic coil. Thus, the rotational force is transmitted from the rotating member to a drive shaft via the armature. A sliding current supply mechanism has a slip ring and a brush, one of which is supported by the rotating member and the other of which is supported by a boss of a housing of an equipment to be driven, and which slide to each other in a contact state to supply the current to the electromagnetic coil.

The sliding current supply mechanism is located in a space between the boss and the drive shaft. Since the sliding current supply mechanism is located in a space between the boss and the drive shaft, the current supply passage is formed without increasing the size of the clutch in axial direction. Thus, installation of the electromagnetic clutch is facilitated. Furthermore, since the sliding current supply mechanism is located near the rotational center of the clutch, the life of the brush is prolonged due to the small peripheral velocity of the brush.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
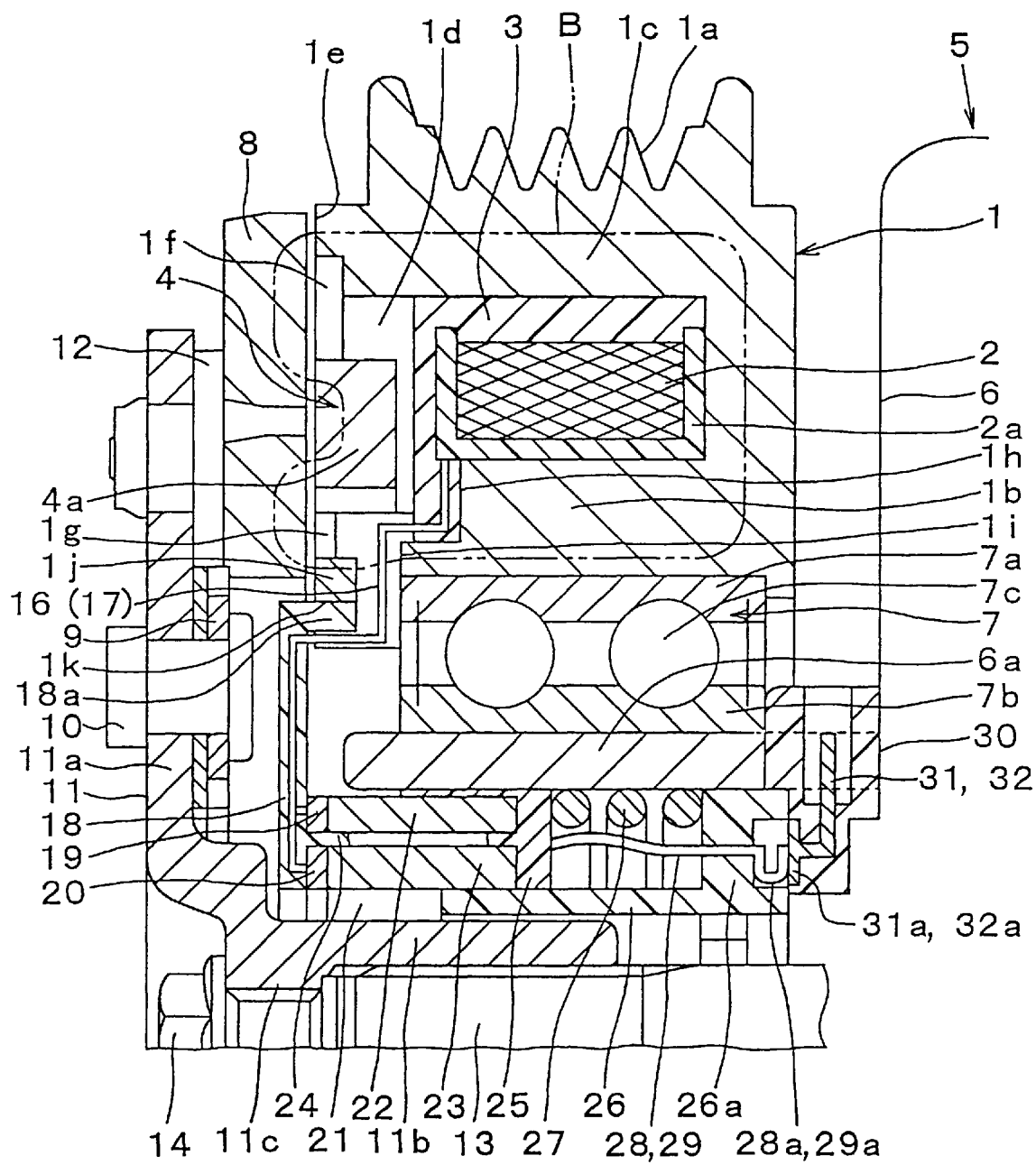
FIG. 1 is a sectional view of a part of an electromagnetic clutch taken along line I—I of FIG. 3 according to a first embodiment of the present invention.
Figure 2:
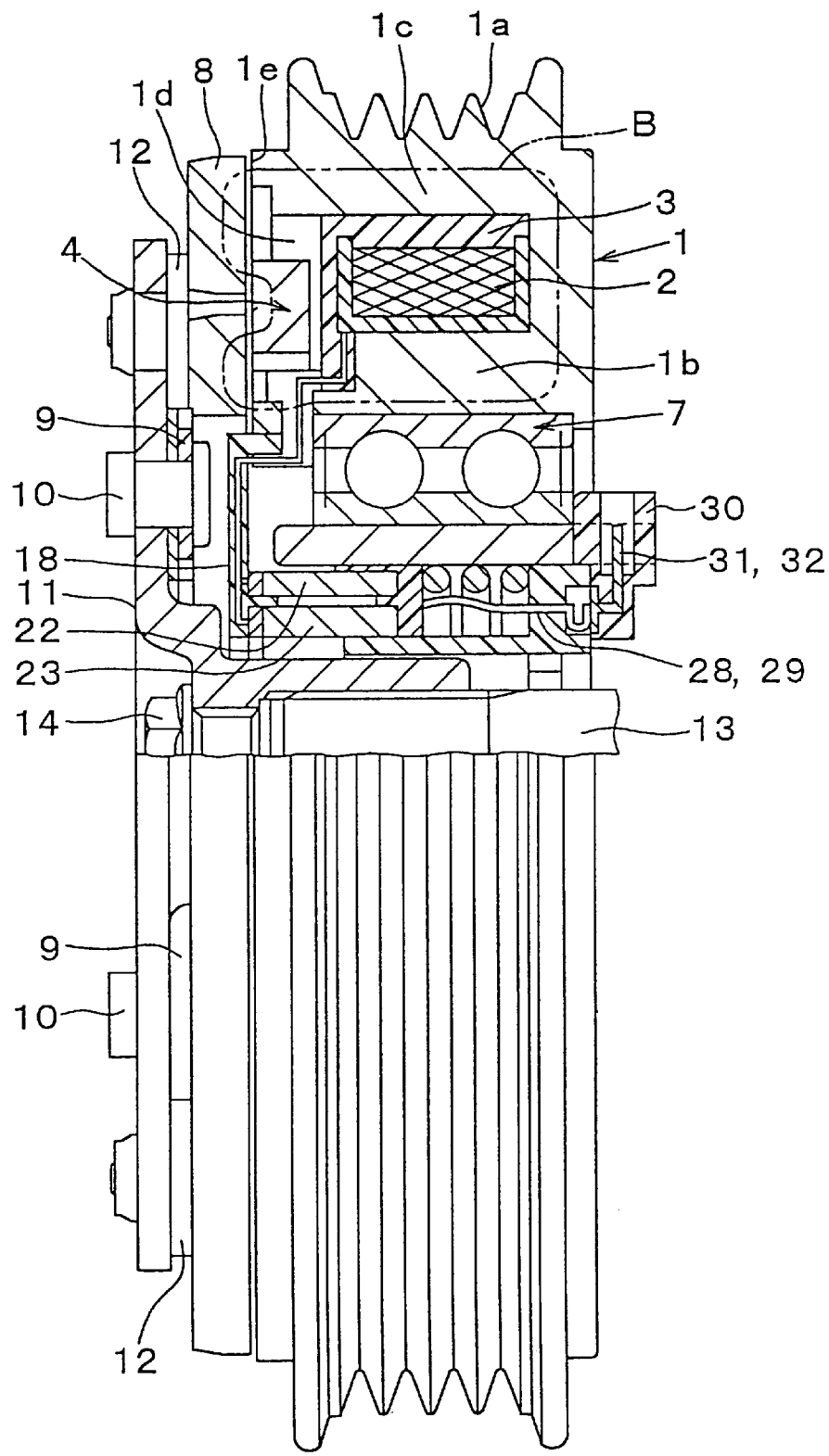
FIG. 2 is a partial sectional side view of the electromagnetic clutch showing the entire shape thereof according to the first embodiment of the present invention.

Embodiments of the present invention will be described hereinafter with reference to the drawings.

First Embodiment

A first embodiment of the present invention is shown in FIGS. 1 through 6.

A pulley 1a, which has V-shaped grooves that engage V-shaped belts on its periphery, is integrally formed with a rotor 1. The rotor 1 is rotationally mounted to receive rotational power from an automobile engine through a belt (not shown). The rotor 1 is formed into a double-ring shape having a U-shaped cross section, and is made out of an iron family metal (ferromagnetic material) such as low carbon steel. A ring-shaped recess 1d is formed between an inner cylindrical member 1b and an outer cylindrical member 1c of the rotor 1. The rotor 1 also has a friction surface 1e on the side in its radial direction.

An electromagnetic coil 2 for generating an electromagnetic attractive force is installed in the recess 1d of the rotor 1. The electromagnetic coil 2 wound on a resin spool 2a is fixed to the recess 1d with an insulation by resin 3 formed in the recess 1d. Therefore, the electromagnetic coil 2 rotates together with the rotor 1.

Figure 3:
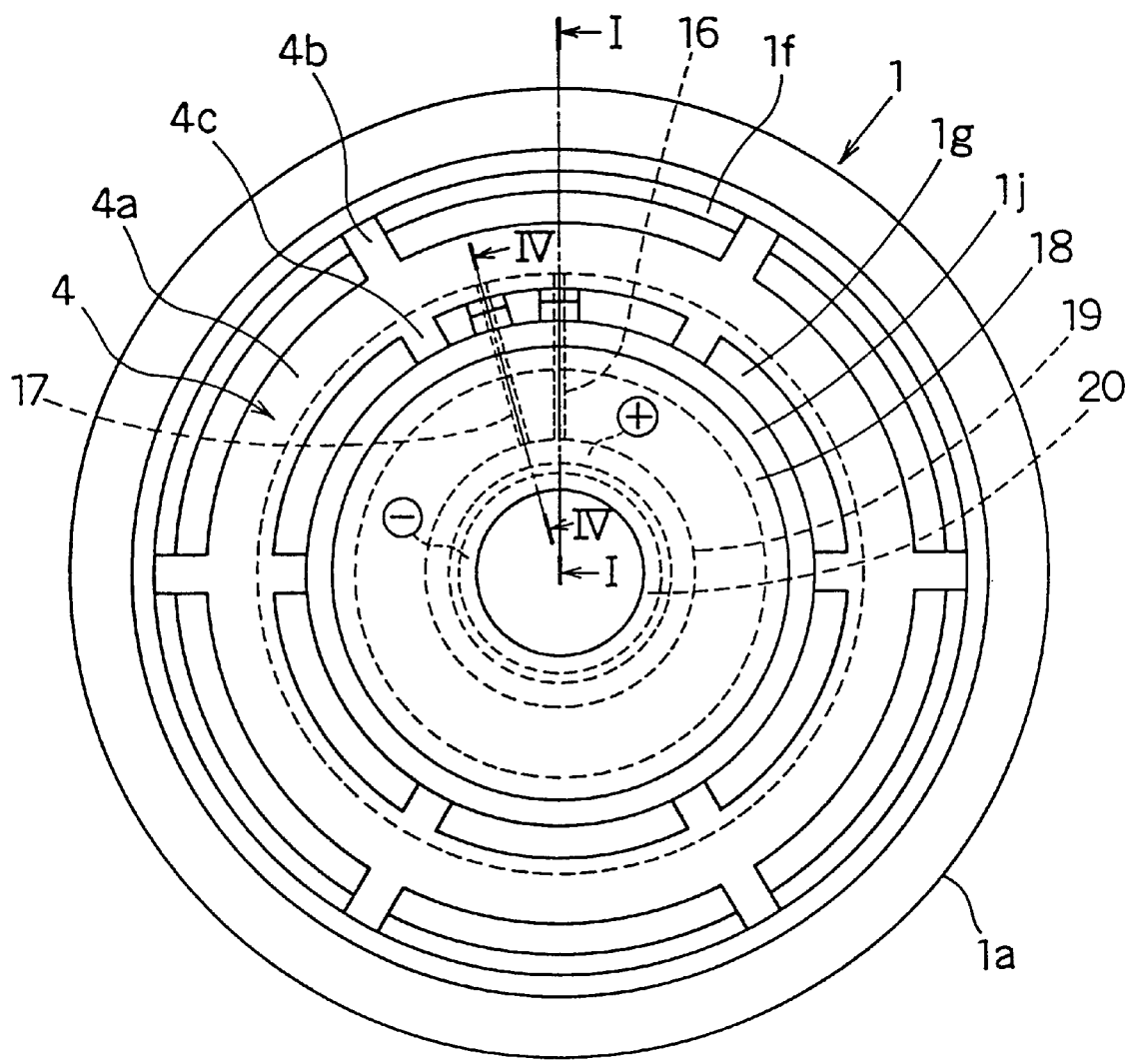
FIG. 3 is a front view of a rotor of the electromagnetic clutch according to the first embodiment of the present invention.
Figure 6A:
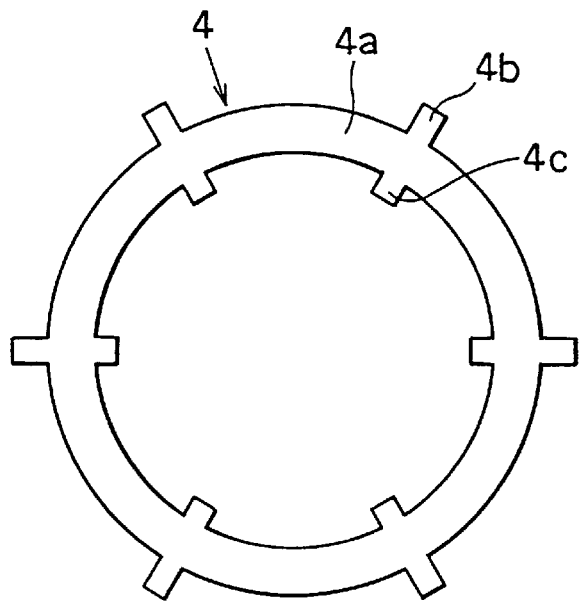
FIG. 6A is a front view of a friction plate to be installed in the rotor of the electromagnetic clutch according to the first embodiment of the present invention.
Figure 6B:
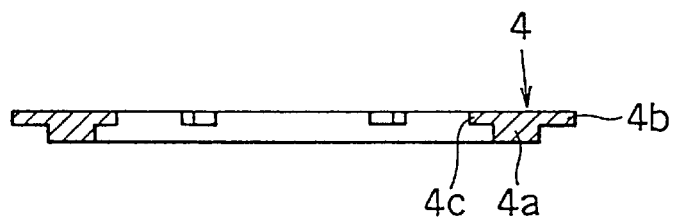
FIG. 6B is a sectional view of the friction plate according to the first embodiment of the present invention.

A friction plate 4 is made out of an iron family metal (ferromagnetic material) such as low carbon steel. As shown in FIGS. 6A and 6B, a plurality of protrusions 4b and 4c are integrally formed on an outer periphery and an inner periphery of a ring-shaped main portion 4a, respectively. These outer protrusions 4b are inserted in and supported by a ring-shaped groove 1f (see FIG. 3) of the outer cylindrical member 1c of the rotor 1. The inner protrusions 4c are inserted in and supported by a ring-shaped groove 1g (see FIG. 3) of the inner cylindrical member 1b of the rotor 1. Further, the inner protrusions 4c are fixed to the inner cylindrical member 1b of the rotor 1 by means of, for example, welding. FIG. 3 shows an assembly aspect of the friction plate 4 to the rotor 1.

A compressor 5, which is a slave device (rotational equipment), has a front housing 6 which is located on the electromagnetic clutch side. The front housing 6 is made out of an aluminum family metal and is integrally formed with a cylindrical boss 6a, which protrudes outwardly in the axial direction at its center portion. The compressor 5 compresses refrigerant used in the refrigeration cycle of an air conditioning apparatus for an automobile, and could be a known swash plate type, vane type, or scroll type compressor.

A bearing 7 rotatably supports the rotor 1 on the boss 6a of the front housing 6. The bearing 7 comprises an outer ring 7a fixed to an inner surface of the rotor 1, an inner ring 7b fixed to an outer surface of the boss 6a, and balls 7c supported between the outer ring 7a and the inner ring 7b such that the balls 7c move by rolling.

An armature 8, which is made out of an iron family metal (ferromagnetic material) and has a shape of a ring plate, is installed facing the friction surface 1e of the rotor 1 and the friction plate 4. The armature 8 is retained by the spring action of a leaf spring 9 (elastic connecting member) at a location (shown in FIG. 1) that maintains a small gap between the armature 8 and the friction surface 1e of the rotor 1 when the current is not supplied to the electromagnetic coil 2. The leaf spring 9 is a long narrow thin plate. Several leaf springs 9 are placed in the circumferential direction of the armature 8. One end of each leaf spring 9 is connected to the armature 8 by a rivet (not shown), and the other end is connected to a hub 11 by a rivet 10.

The hub 11 is made out of an iron family metal, and has a disk portion 11a which is extended in the radial direction and a central cylinder portion 11b. A stopper 12, which is made out of an elastic material such as rubber, is attached to an outer periphery of the disk portion 11a. The stopper 12 specifies the location of the armature 8 in the axial direction (the location of the armature 8 when the current is not supplied to the electromagnetic coil).

The central cylinder portion 11b of the hub 11 engages a drive shaft 13 of the compressor 5 by means of a spline connection to prevent a relative rotation. The hub 11 is connected to the drive shaft 13 by screwing a bolt 14 into a threaded hole at the edge of the drive shaft 13 and holding an inner collar 11c of the hub 11 between a step portion of the drive shaft 13 and the bolt 14.

A passage structure for supplying current to the electromagnetic coil 2, which rotates together with the rotor 1, will be described hereinafter. The main feature of the present invention is a sliding current supply mechanism having slip rings 19, 20 and brushes 22, 23 located at an inner periphery of the boss 6a which supports the bearing 7 in the current supply passage.

The sliding current supply mechanism is arranged as follows. Grooves 1h, 1i are formed on the inner cylindrical member 1b of the rotor 1 at the armature 8 side and inside the electromagnetic coil 2. Two leads 16, 17, separated from each other by a certain distance for insulating purposes, are connected to an anode and a cathode of the electromagnetic coil 2, and are inwardly wired in the grooves 1h, 1i. One of the leads 16, 17 is omitted in FIGS. 1 and 2 to simplify the drawings. In the first embodiment of the present invention, the leads 16, 17 are bare leads made out of a conductor, such as copper or aluminum.

A ring-shaped retaining plate 18, which is made out of an electrical insulating material such as resin, is located inside the inner periphery of the armature 8 and the friction plate 4.

The retaining plate 18 has a plurality of projections 18a on its outer circumferential periphery. The inner cylindrical member 1b has an inner projection 1j and a recess 1k which is formed on the inner projection 1j. The retaining plate 18 is integrally supported in the inner periphery of the rotor 1 such that the retaining plate 18 rotates together with the rotor 1 by joining and latching the projections 18a to the recess 1k.

Figure 4:
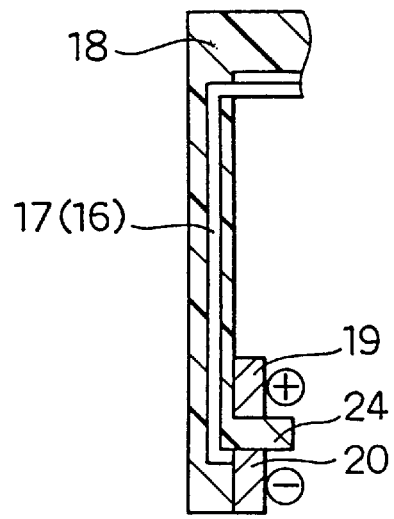
FIG. 4 is a partial sectional view of a portion of the electromagnetic clutch taken along line IV—IV of FIG. 3 according to the first embodiment of the present invention.

The anode side slip ring 19 and the cathode side slip ring 20 are concentrically fixed to the boss 6a side at the inner circumferential portion of the retaining plate 18. As shown in FIG. 4, the inner circumferential portion of the lead 17 is buried inside the retaining plate 18, and the inner circumferential edge of the lead 17 is electrically connected to the cathode side slip ring 20 by means of welding. The lead 16 (omitted to simplify the drawing) is electrically connected to the anode side slip ring 19 in the same way.

A gap 21 is formed between the central cylinder portion 11b of the hub 11 fixed to the drive shaft 13 of the compressor 5 and the inner periphery of the boss 6a. The anode side brush 22 and the cathode side brush 23 are installed in the gap 21. The brushes 22, 23 are pipe-shaped. Ring-shaped retaining members 24 and 25, which are made out of an electrical insulating material such as resin, are located at both ends of the brushes 22 and 23 in the axial direction. The retaining members 24, 25 retain the pipe-shaped brushes 22, 23 to maintain a gap in the radial direction between the brush 22 and the brush 23.

The pipe-shaped brushes 22, 23 are isolated from each other because the retaining members 24, 25 maintain a certain distance between the brush 22 and the brush 23 in the radial direction. An extended outer circumferential portion of the retaining member 25 isolates between the outer brush 22 and the inner periphery of the boss 6a. Although the retaining member 24 can be integrally formed with the retaining plate 18, it may be formed by attaching a separate part to the retaining plate 18.

Figure 5:
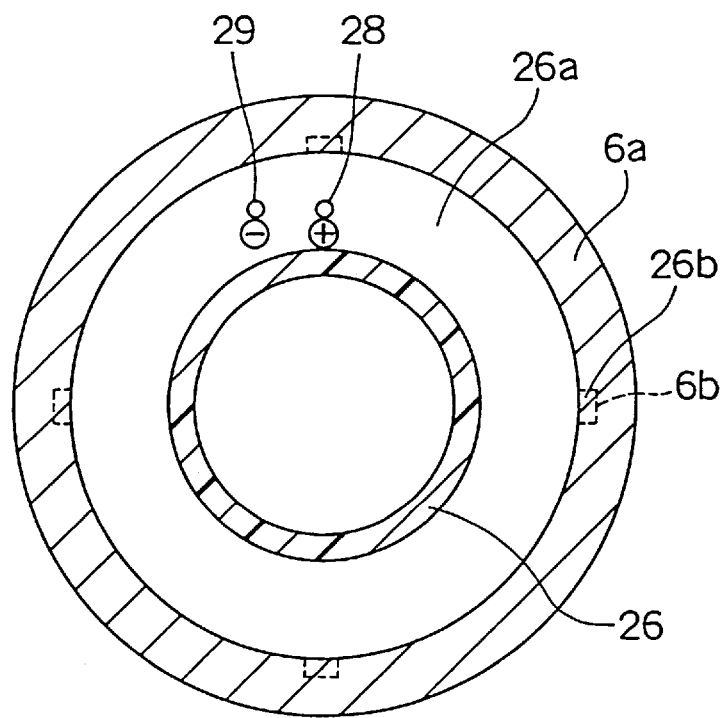
FIG. 5 is a sectional view of a part of the electromagnetic clutch showing the shape of a boss and a cylindrical holding member according to the first embodiment of the present invention.

Furthermore, a pipe-shaped retaining member 26, which extends from the inner circumferential portion of the inner brush 23 to the compressor 5, is installed in the gap 21. The retaining member 26 is also made out of an electrical insulating material such as resin, and has a plurality of projections 26b at the outer circumferential portion of a collar 26a of the retaining member 26 as shown in FIG. 5. The retaining member 26 is supported by the inner circumferential portion of the boss 6a by joining and latching the projections 26b to a recess 6b which is formed on the inner circumferential surface of the boss 6a.

The retaining member 26 is fixed to the boss 6a holding a certain gap between the inner circumferential surface of the retaining member 26 and the outer circumferential surface of the central cylinder portion 11b of the hub 11. The retaining member 25 is supported between the outer circumferential surface of the retaining member 26 and the inner circumferential surface of the boss 6a.

A coil spring 27, as an elastic bias member for elastically biasing the brushes 22 and 23, is located between the retaining member 25 and the collar 26a of the retaining member 26 to bias the brushes 22, 23 into contact with the slip rings 19, 20. One end of each of the anode side lead 28 and a cathode side lead 29 is electrically connected to the brushes 22, 23, respectively, extending through the retaining member 25. One of the leads 28, 29 is omitted in the drawings to simplify the drawings.

Each of the leads 28, 29 is covered by an insulation film. The other ends of the leads 28, 29 are exposed to the outside of the collar 26a extending through the collar 26a of the retaining member 26. Hook portions 28a, 29a, having a predetermined spring constant, are formed at the exposed ends of the leads 28, 29.

A resin connector 30 is formed and fixed on the outer surface of the front housing 6. Terminals 31, 32, which each have a thin plate shape and are made out of a conductive material, are outwardly provided in the radial direction of the front housing 6 to maintain a gap between the terminal 31 and the terminal 32 in the connector 30. One of the terminals 31, 32 is omitted in the drawings to simplify the drawings.

The terminals 31, 32 have plate portions 31a, 32a, respectively, which oppose the collar 26a of the retaining member 26. The leads 28, 29 are electrically connected to the terminals 31, 32 since the hooks 28a, 29a of the leads 28, 29 are elastically biased and contact the plate portions 31a, 32a.

A current supply passage of the electromagnetic coil 2 comprises the leads 16, 17, the slip rings 19, 20, the brushes 22, 23, the leads 28, 29, and the terminals 31, 32. The terminals 31, 32 are electrically connected to an external control circuit (not shown) for controlling a connection and a disconnection of the electromagnetic clutch (that is ON and OFF operation of the compressor 5).

The operation of the first embodiment will be described hereinafter. When the automobile engine (not shown) is driven, the rotational power of a crank pulley of the engine is transmitted to the pulley 1a via the belt (not shown) and the rotor 1. The electromagnetic coil 2 always rotates, as the rotor 1 is rotationally supported on the outer circumferential surface of the boss 6a of the front housing 6 by the bearing 7.

The leads 16, 17, the retaining plate 18, and the slip rings 19, 20 rotate together with the rotor 1 and the electromagnetic coil 2 according to the rotation of the rotor 1and the electromagnetic coil 2. On the contrary, all the brushes 22, 23, the retaining members 25, 26, the coil spring 27, and the leads 28, 29 are supported by the boss 6a and fixed. Therefore, the rotating slip rings 19, 20 slide on one end of each of the brushes 22, 23 in the axial direction keeping contacts with the brushes 22, 23 which are biased by the spring force of the coil spring 27.

When a voltage is applied from a car battery to the terminals 31, 32 of the connector 30 by the external control circuit to operate the compressor 5, current is supplied to the electromagnetic coil 2 via a current supply passage formed by the above described elements (16, 17, 19, 20, 22, 23, 28, 29). Thus, a magnetic circuit B (shown in FIG. 1 by the phantom line) is formed between the rotor 1 and the armature 8 by magnetic flux. Therefore, an electromagnetic attractive force is generated between the friction surface 1e and the armature 8, and between the friction plate 4 and the armature 8. The friction surface 1e of the rotor 1 and the friction plate 4 attract the armature 8 against the spring force along the axial direction (the spring force to the left in FIG. 1) of the leaf spring 9.

As a result, the armature 8 rotates together with the rotor 1, and rotates together with the hub 11 via the leaf spring 9 and the rivet 10. Thus, the rotational power of the rotor 1 is transmitted to the drive shaft 13 of the compressor 5 via the hub 11, and the compressor 5 is driven.

The supplying current to the electromagnetic coil 2 is stopped when the compressor 5 is to be cut off. When the supplying current to the electromagnetic coil 2 is stopped, the above described electromagnetic attractive force disappears. Therefore, the armature 8 is detached from the friction surface 1e of the rotor 1 and the friction plate 4, and the transmission of the rotational power to the drive shaft 13 of the compressor 5 is cut off, and the compressor 5 stops.

According to the first embodiment of the present invention, since the sliding current supply mechanism is located in the boss, the current supply passage is formed without increasing the size of the clutch in the axial direction. Thus the installation of the electromagnetic clutch in the engine room is facilitated. Furthermore, since the sliding current supply mechanism is located at near the rotational center of the clutch, the peripheral velocity of the brush is small, whereby the life of the brush is prolonged.

Second Embodiment

According to the first embodiment of the present invention, although the brushes 22, 23, which contact and slide on the slip rings 19, 20, are pipe-shaped, locations of the brushes 22, 23 in the circumferential direction are not fixed. Therefore, the brushes 22, 23 may be forced to deviate and rotate according to the rotation of the slip rings 19, 20.

Figure 7:
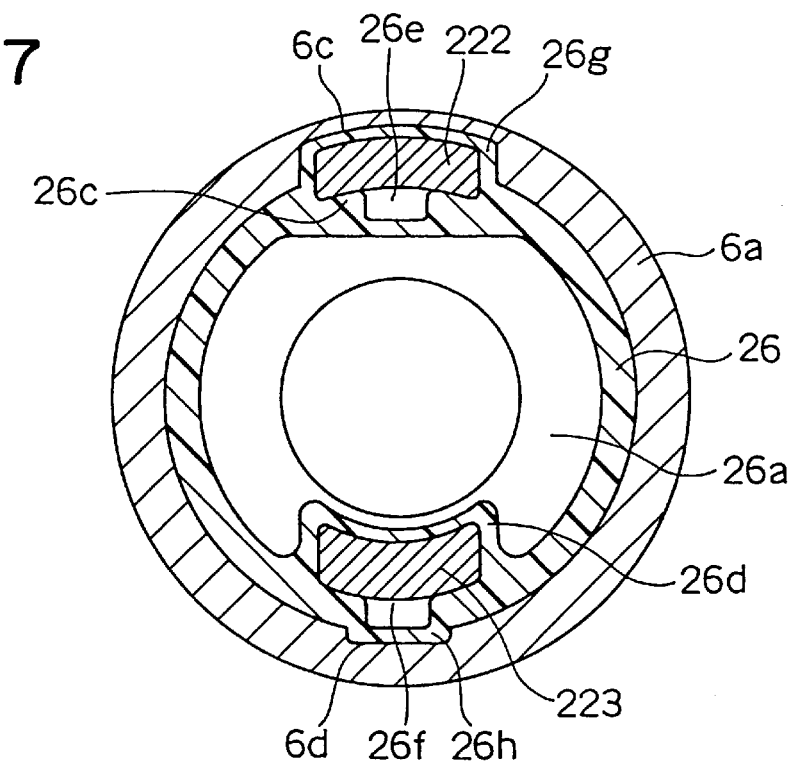
FIG. 7 is a sectional view of a part of an electromagnetic clutch, omitting a hub 11 and a drive shaft 13, taken along line VII—VII of FIG. 8 according to a second embodiment of the present invention.
Figure 8:
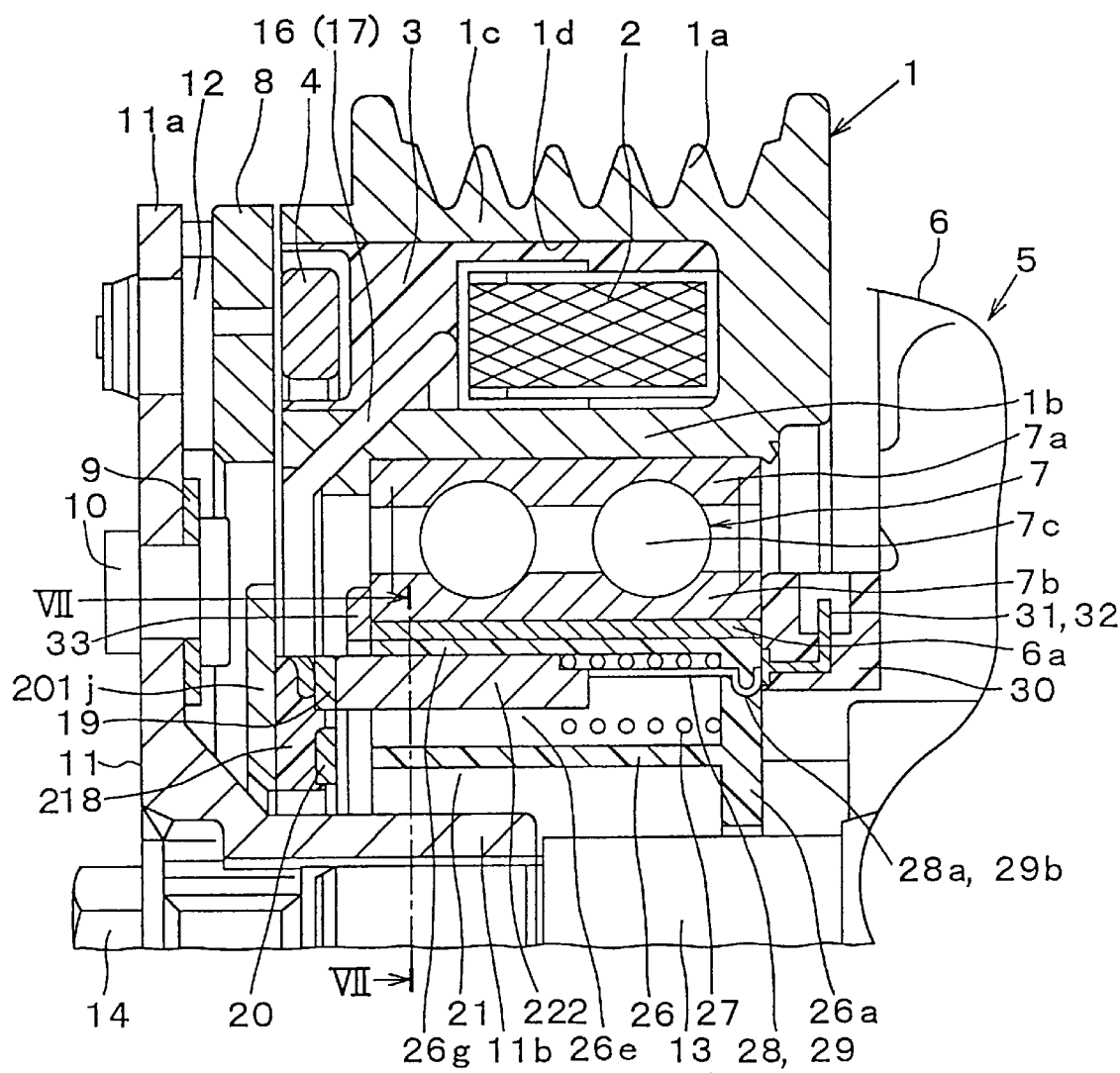
FIG. 8 is a sectional view of a part of an electromagnetic clutch according to the second embodiment of the present invention.

A second embodiment of the present invention is to prevent the deviated rotation of the brushes 22, 23 by securely fixing the brushes 22, 23. As shown in FIGS. 7 and 8, an anode side brush 222 and a cathode side brush 223 are formed into a shape of a part of a pipe. In other words, the brushes 222, 223 are formed to have a shape of a part of the boss 6a in the circumferential direction (cross sectional area has a shape of a circular arc).

Brush holding portions 26c, 26d, which correspond to the retaining member 25 in the first embodiment, are integrally formed with the retaining member 26 made out of resin. Accommodation holes (accommodation space) 26e, 26f, which have shapes to fit the brushes 222, 223, are formed in the brush holding portions 26c, 26d. The anode side brush 222 and the cathode side brush 223 remain slidable with contact in the axial direction in the accommodation holes 26e, 26f, and the locations of the brushes 222, 223 in the circumferential direction are fixed in the accommodation holes 26e, 26f.

A recess 6c and a recess 6d are symmetrically formed 180° apart from each other inside the inner periphery of the boss 6a. The retaining member 26 is prevented from rotating by joining and latching outer circumferential protrusions 26g, 26h of the brush holders 26c, 26d to the recesses 6c, 6d, respectively.

The location of the anode side brush 222 is axially spaced from the cathode side brush 223 and is circumferentially shifted 180° from the location of the cathode side brush 223. The anode side brush 222 contacts the anode side (outer) slip ring 19. The cathode side brush 223 contacts the cathode side (inner) slip ring 20. Therefore, the brush 222 is not located on the same circumferential position as the brush 223.

According to the second embodiment of the present invention, the deviated rotation of the brushes 222, 223 caused by the rotation of the slip rings 19, 20 is prevented by fixing the brushes 222, 223 being secured in the circumferential direction at the recesses 6c, 6d via the retaining member 26.

In the second embodiment of the present invention, an inner projection 201j of the inner cylindrical portion 1b is inwardly extended to the positions of the slip rings 19, 20. A retaining member 218, which comprises a potting resin, is installed in the inner projection 201j. The slip rings 19, 20 are fixed and supported by the retaining member 218. The leads 16, 17, covered by the insulation film and connected to both sides of the electromagnetic coil 2, extend through the retaining member 218 and are electrically connected to the slip rings 19, 20 by means of welding or the like.

In the second embodiment of the present invention, the rotor 1 and the slip rings 19, 20 are integrated beforehand by forming the inner projection 201j, which protrudes inwardly toward the inner location of the boss 6a, on the inner cylindrical portion 1b and fixes and supports the slip rings 19, 20 via the retaining member 218. The integrated assembly of the rotor 1 and slip rings 19, 20 are installed in the boss 6a via the bearing 7. A circlip 33 is fixed to the boss 6a to position and fix the inner ring 7b of the bearing 7. Other features are the same as the first embodiment. In this and subsequent embodiments, components which are substantially the same to those in the previous embodiments are assigned the same reference numerals.

According to the second embodiment of the present invention, the rotor 1 and the slip rings 19, 20 can be integrated beforehand. Therefore, both ends of the electromagnetic coil 2 and the slip rings 19, 20 can be connected electrically by the leads 16, 17 beforehand. After the connections are made, the integrated assembly of the rotor 1 and slip rings 19, 20 is installed in the boss 6a via the bearing 7.

Third Embodiment

Figure 9:
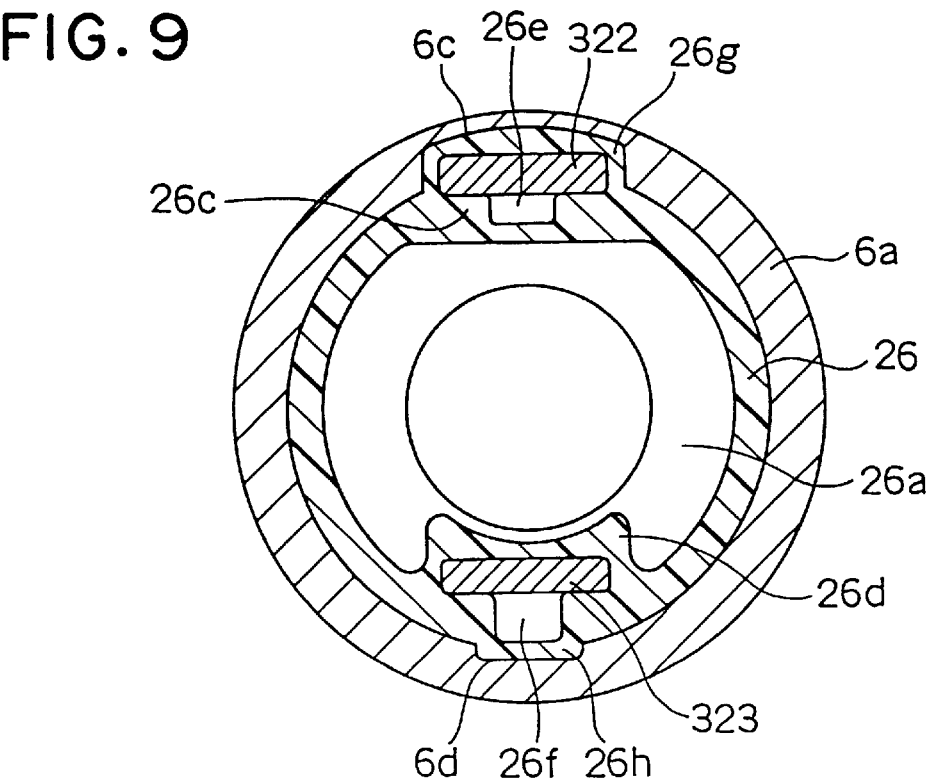
FIG. 9 is a sectional view of a part of an electromagnetic clutch according to a third embodiment of the present invention.

A third embodiment of the present invention is shown in FIG. 9. In the third embodiment, an anode side brush 322 and a cathode side brush 323 are formed to have a plate shape. Other features are the same as the second embodiment.

Fourth Embodiment

Figure 10:
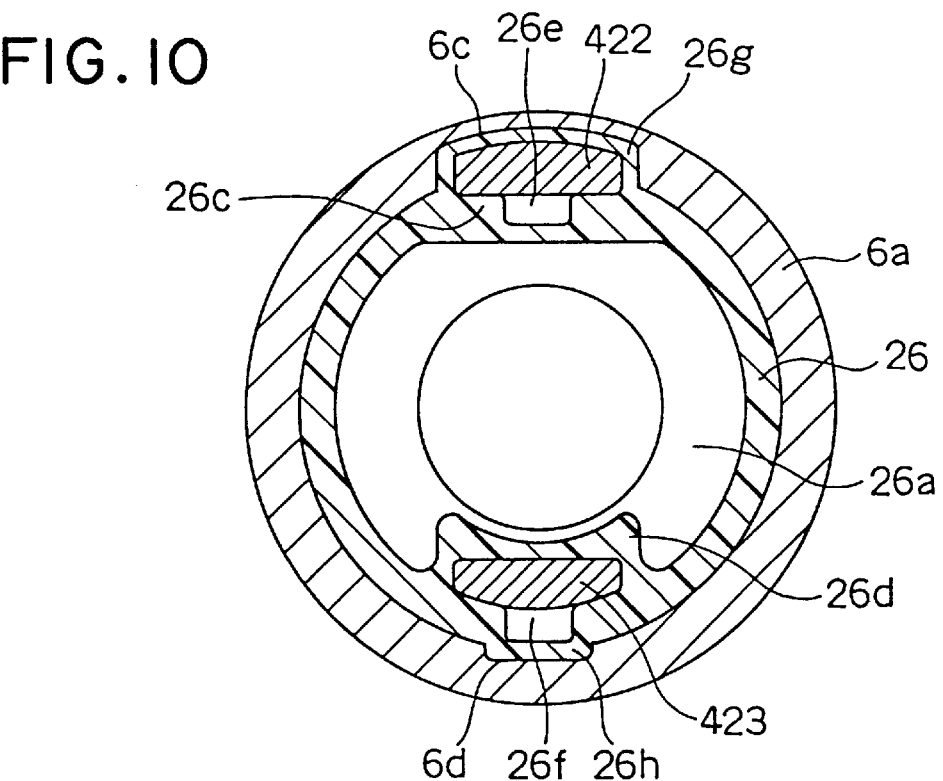
FIG. 10 is a sectional view of a part of an electromagnetic clutch according to a fourth embodiment of the present invention.

A fourth embodiment of the present invention is shown in FIG. 10. In the fourth embodiment, an anode side brush 422 and a cathode side brush 423 are formed to have an arc-shaped outer circumferential surfaces. Other features are the same as the second embodiment.

Fifth Embodiment

In the second embodiment of the present invention, the inner projection 201j, which protrudes inwardly toward the inner location than the boss 6a, is formed on the inner cylindrical portion 1b, and the slip rings 19, 20 are fixed and supported by the inner projection 201j via the retaining member 218. Thus, the rotor 1 and the slip rings 19, 20 can be integrated beforehand, and assembly is made easier.

However, the attachment and detachment work of the circlip 33 becomes difficult, and replacement of components such as brushes 222, 223 becomes difficult because the inner projection 201j, the retaining member 218 and the slip rings 19, 20 cover the side of the top portion of the boss 6a.

A fifth embodiment of the present invention achieves easier attachment and detachment work of the circlip 33 even with the use of the prior integrated assembly of the rotor 1 and the slip rings 19, 20.

Figure 11:
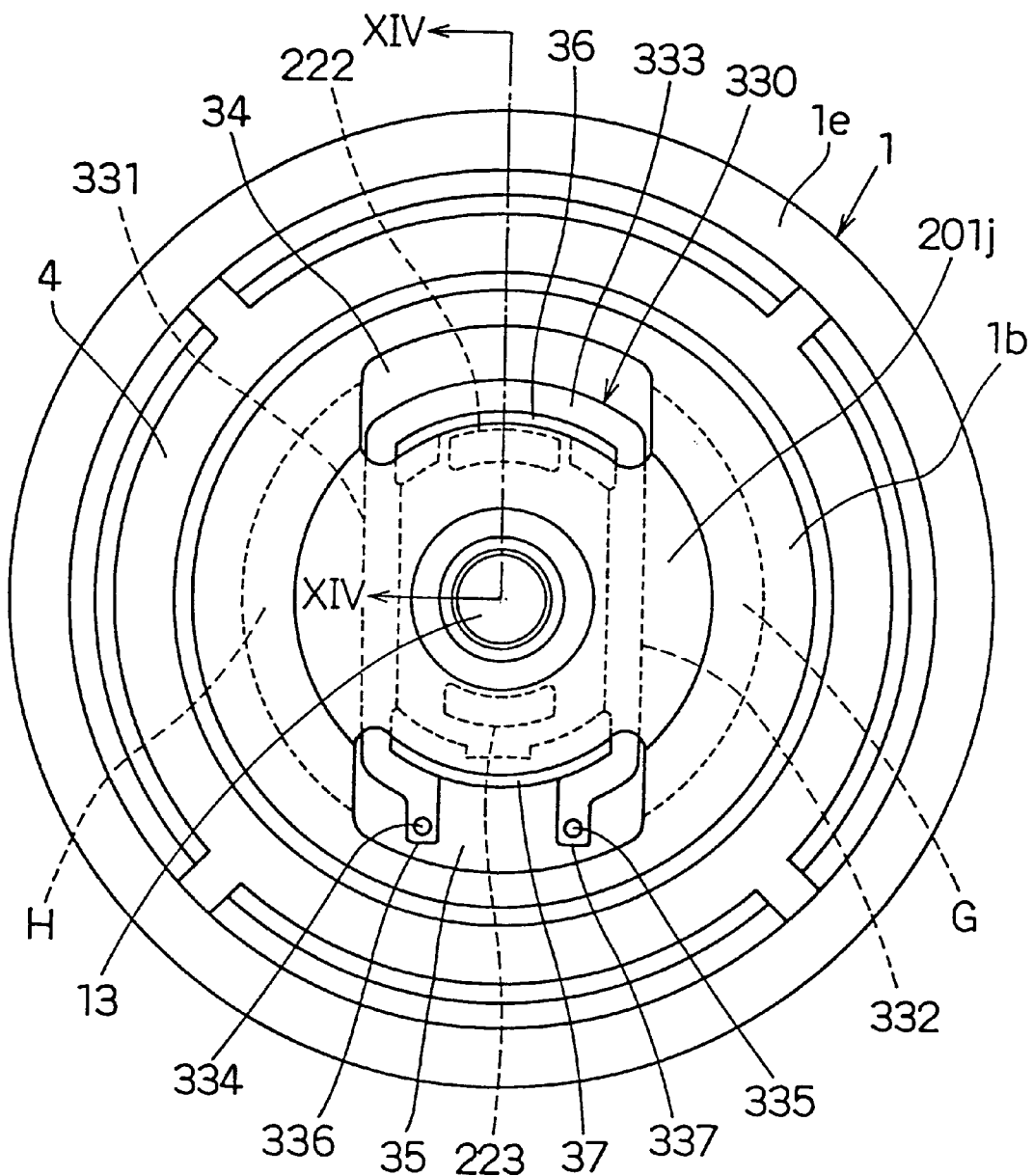
FIG. 11 is a front view of a rotor of an electromagnetic clutch according to a fifth embodiment of the present invention.
Figure 12:
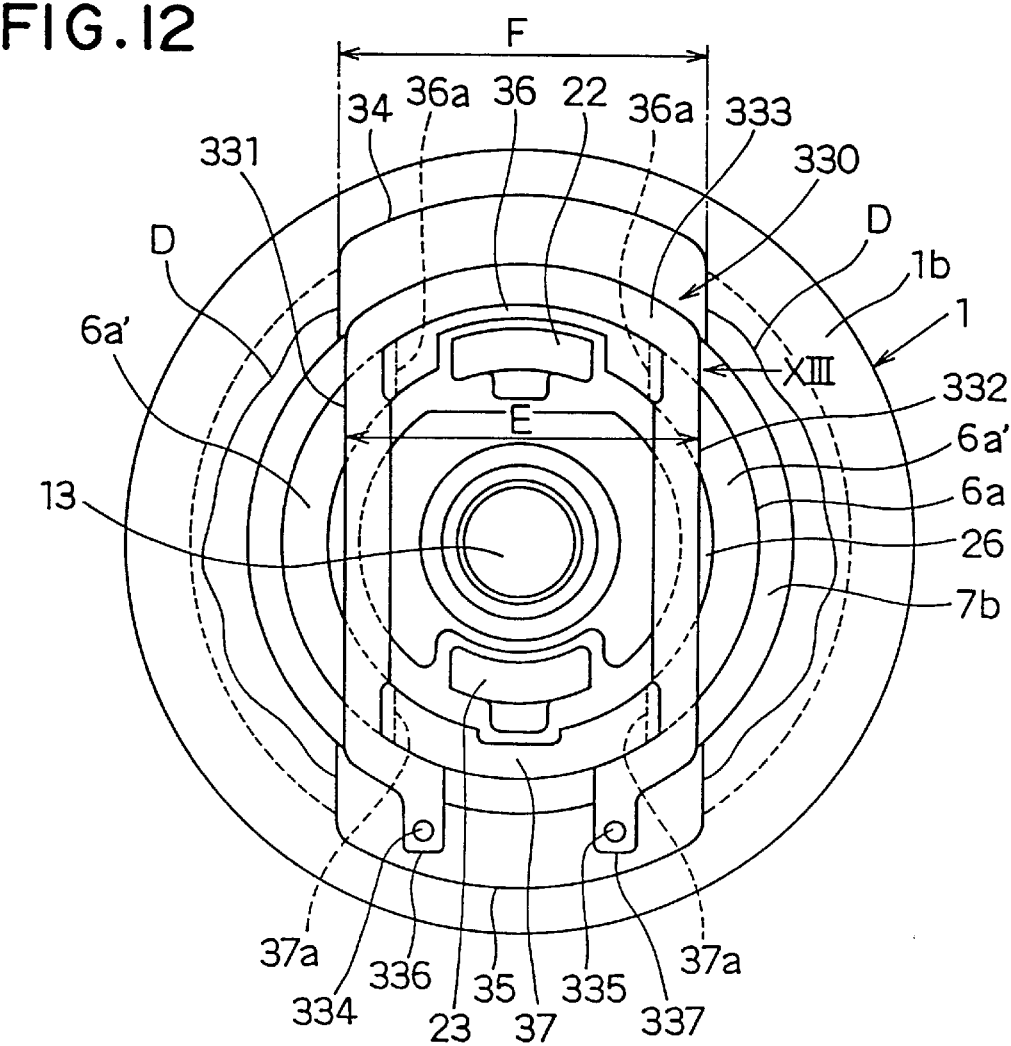
FIG. 12 is a partially cutaway view of the rotor according to the fifth embodiment of the present invention.
Figure 13:
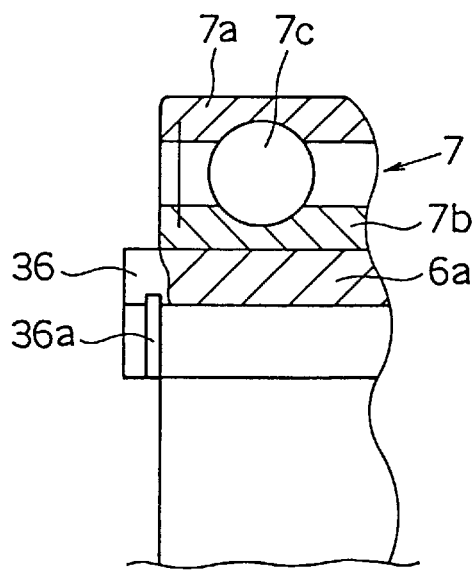
FIG. 13 is a partial sectional view of a part of the electromagnetic clutch viewed from arrow XIII in FIG. 12 according to the fifth embodiment of the present invention.
Figure 14:
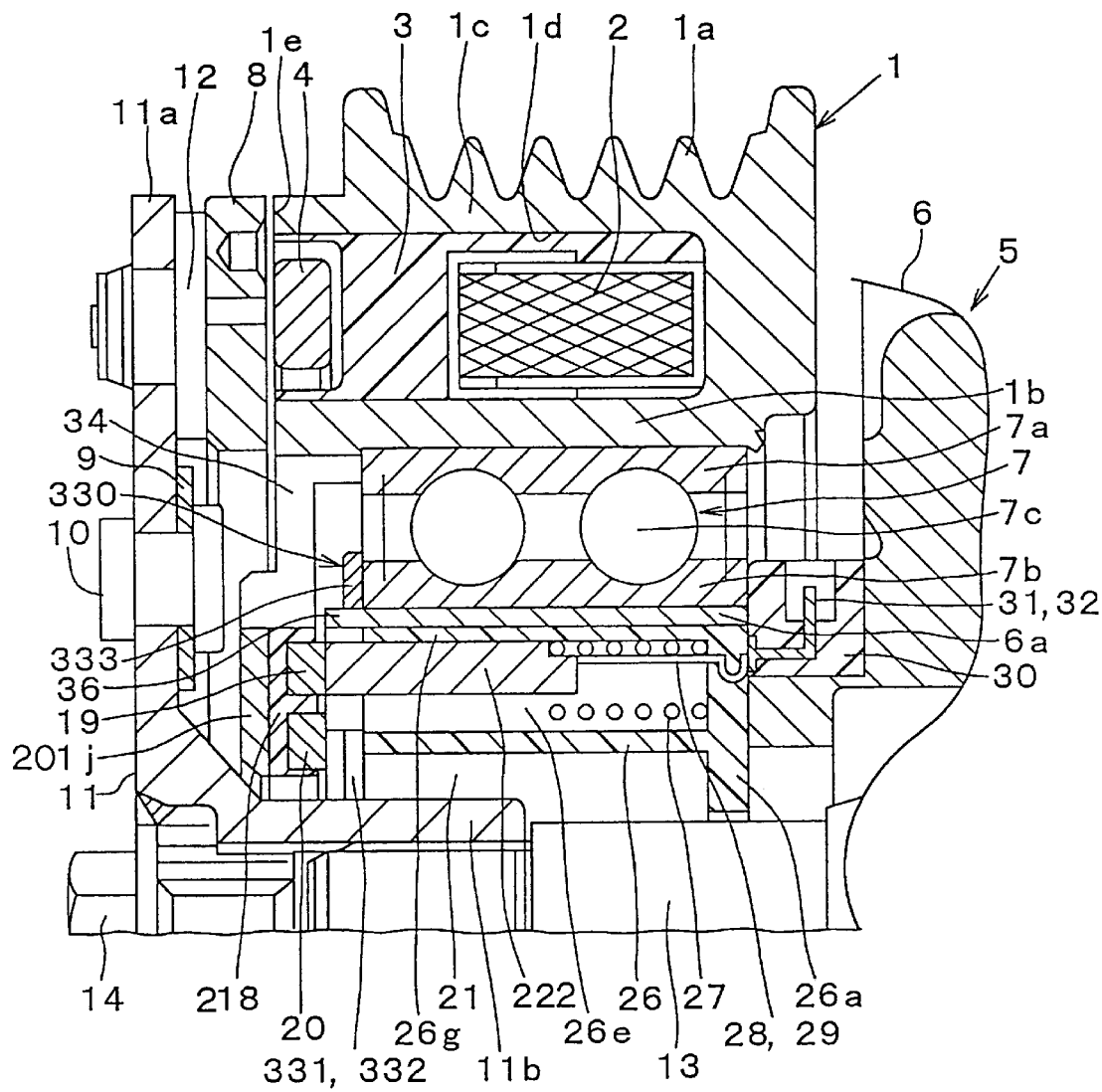
FIG. 14 is a sectional view of a part of an electromagnetic clutch taken along line XIV—XIV of FIG. 11 according to the fifth embodiment of the present invention.

The fifth embodiment of the present invention is shown in FIGS. 11 through 14. FIG. 12 shows the entire of a circlip 330, as a part of the inner projection 201j of the rotor 1 is cut away in FIG. 11. The outer circumferential part is cut away at the inner cylindrical portion 1b. In FIG. 12, D represents a cutaway line of a partial view of the inner projection 201j. FIG. 13 is a partial sectional view viewed from arrow XIII in FIG. 12. FIG. 14 is a sectional view taken along line XIV—XIV of FIG. 11.

In the fifth embodiment of the present invention, a circlip 330 is formed in a substantially rectangular shape having leg portions 331, 332 which are extended parallel in the rectangular direction of the axis of the drive shaft 13, and an arc-shaped connecting portion 333 which connects one end of each of the leg portions 331, 332. Operation portions 336, 337 having tool holes 334, 335 are formed closer at the other end of each of the leg portions 331, 332, respectively. The circlip 330 is made out of suitable metal (for example, spring steel).

As shown in FIG. 12, the width E between outer edges of the leg portions 331, 332 is predetermined such that the leg portions 331, 332 locate in the range of the outer diameter of the retaining member 26 and contact the side surface of the retaining member 26, because the circlip 330 also functions to support and fix the retaining member 26 of the brushes 222, 223.

Insert holes 34, 35 are symmetrically formed 180° apart from one another along the inner periphery of the inner cylindrical portion 1b of the rotor 1. The insert holes 34, 35 are formed in an approximate arc shape. As shown in FIG. 12, the width F is set to be a little greater than the width E of the connecting portion 333 of the circlip 330 such that the circlip 330 can be inserted to the inside of the inner projection 201j (FIGS. 11 and 14) via one of the insert holes 34 or 35.

As shown in FIG. 11, the outer circumference of the inner projection 201j is continuously connected to the inner cylindrical member 1b between the insert holes 34 and 35. Therefore, the leads 16, 17 (see FIG. 8 in the second embodiment) which connect both ends of the electromagnetic coil 2 to the slip rings 19, 20 can be located inside such continuous connecting portions G, H.

A top portion of the cylindrical boss 6a of the front housing 6 has an edge surface 6a' as shown in FIG. 12. Arc-shaped projections 36, 37, which further protrude outwardly in the axial direction from the edge surface 6a', are integrally formed with the top portion of the cylindrical boss 6a. The arc-shaped projections 36, 37 are formed on the same circumferential positions as the insert holes 34, 35, respectively, with 180° symmetry. Grooves 36a, 37a (FIGS. 12, 13) are formed at both edge surfaces of the arc-shaped projections 36, 37 in the circumferential direction. The inner edge portions of the leg portions 331, 332 of the circlip 330 are joined and latched to the grooves 36a, 37a.

Other features in the fifth embodiment are the same as the second embodiment.

The assembling method of the rotor 1 in the fifth embodiment of the present invention will be described as follows. The slip rings 19, 20 are held and fixed to the inner projection 201j of the rotor 1 via the retaining member 218. Both ends of the electromagnetic coil 2 and the slip rings 19, 20 are electrically connected by the leads 16, 17 (see FIG. 8). Then, the outer ring 7a of the bearing 7 is fixed to the inner cylindrical portion 1b of the rotor 1 with a tight fit.

Then, after placing the brushes 222, 223 with the retaining member 26, the coil spring 27 and the like at the inner circumferential side of the boss 6a, the inner ring 7b of the bearing 7 is joined to the outer circumferential periphery of the boss 6a from the top portion of the boss 6a with a loose fit to make the boss 6a detachable from the bearing 7.

Then, the leg portions 331, 332 of the circlip 330 are inserted to the inside of the inner projection 201j through one of the insert holes 34, 35 (for example, through the upper insert hole 34). Accordingly, the tool holes 334, 335 at the top portions of the circlip 330 are exposed to the outside through the lower insert hole 35. An operational tool (circlip pliers) which is not shown in the drawings is inserted to the tool holes 334, 335 via the lower insert hole 35, and the leg portions 331, 332 of the circlip 330 are elastically pushed and widened by the operational tool. With keeping the leg portions 331, 332 widened by using the operational tool, the inner edge portions of the leg portions 331, 332 are joined and latched to the grooves 36a, 37a of the projections 36, 37, respectively.

The bearing 7 can be positioned in the axial direction and fixed by joining and latching to the grooves 36a, 37a. Simultaneously, the leg portions 331, 332 of the circlip 330 contact the top portion of the retaining member 26 (see FIG. 14), and the retaining member 26 can be positioned in the axial direction and fixed.

When the brushes 222, 223 are replaced, the replacing operation order is opposite to the one for the assembling. First, the operational tool is inserted to the tool insert holes 334, 335. The leg portions 331, 332 are widened by the operational tool, and the inner edge portion of the leg portions 331, 332 are detached from the grooves 36a, 37a of the projections 36, 37.

Then, the circlip 330 is removed from the rotor 1 via one of the insert holes 34, 35, and the inner ring 7b of the bearing 7 is removed from the boss 6a. Finally, the brushes 222, 223 can be replaced.

Accordingly, the fifth embodiment of the present invention facilitates the attachment and detachment of the circlip 330 and the replacement of the brushes 222, 223 and the like.

Sixth Embodiment

Figure 15:
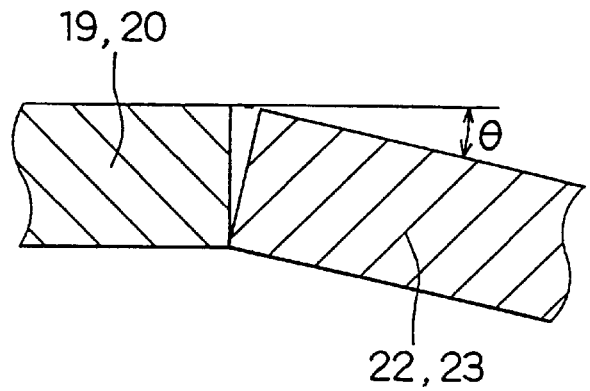
FIG. 15 is a partially enlarged sectional view of a contact portion between a slip ring and a brush illustrating the problem to be solved in a sixth embodiment of the present invention.

Since the slip rings 19, 20 contact the brushes 22(222), 23(223) at plane surfaces in the first through fifth embodiments, the contacts between the slip rings 19, 20 and the brushes 22, 23 become point contacts if the brushes 22, 23 incline at an angle of θ because of a disturbance such as friction, as shown in FIG. 15. Such point contacts may cause a problem, such as a defective current supply to the electromagnetic coil 2, an abnormal abrasion of the brushes 22, 23, or the like.

Figure 16A:
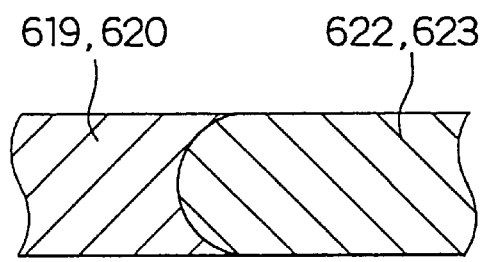
FIG. 16A is a partially enlarged sectional view of a contact portion between a slip ring and a brush according to the sixth embodiment of the present invention.
Figure 16B:
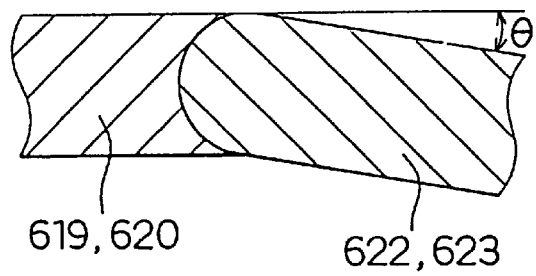
FIG. 16B is a partially enlarged sectional view of the contact portion between the slip ring and the brush according to the sixth embodiment of the present invention.
Figure 17:
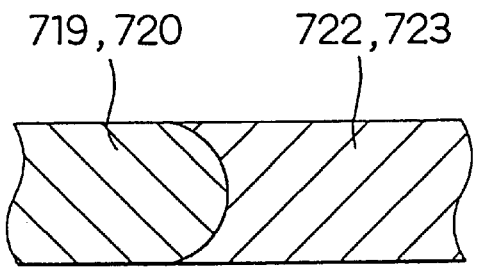
FIG. 17 is a partially enlarged sectional view of a contact portion between a slip ring and a brush showing another application according to the sixth embodiment of the present invention.

A sixth embodiment of the present invention, which is made in light of the foregoing problem, employs curved contact surfaces between slip rings 619, 620 and brushes 622, 623, respectively as shown in FIG. 16A. Specifically, contact portions between the slip rings 619, 620 and the brushes 622, 623 are formed to have an arc-shaped surface which curves along the inclining direction of the brushes 622, 623. Thus, the slip rings 619, 620 contact the brushes 622, 623 at the curved surfaces even if the brushes 622, 623 incline at an angle of θ, as shown in FIG. 16B. Thus, the contacts between the slip rings 619, 620 and the brushes 622, 623 are maintained as surface contacts, not the point contacts. As shown in FIGS. 16A and 16B, the slip rings 619, 620 have an arc-shaped concave surface, and the brushes 622, 623 have an arc-shaped convex surface. Conversely, it is possible to modify the slip rings 719, 720 to have the arc-shaped convex surface and the brushes 722, 723 to have the arc-shaped concave surface as shown in FIG. 17.

Figure 18:
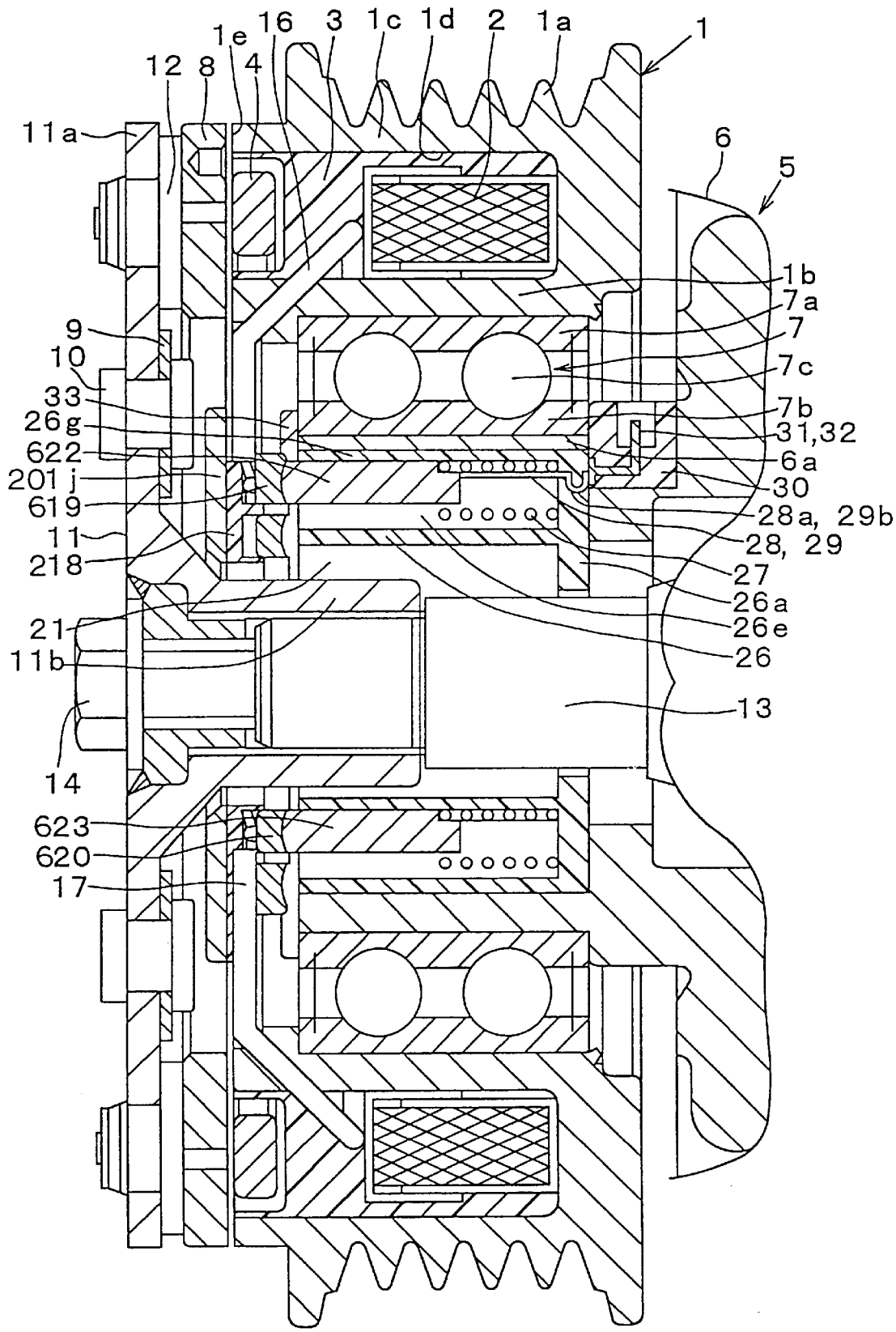
FIG. 18 is a longitudinal sectional view of an electromagnetic clutch according to the sixth embodiment of the present invention.

FIG. 18 shows the electromagnetic clutch having the slip ring 619, 620 and the brushes 622, 623 shown in FIG. 16.

Seventh Embodiment

As shown in FIG. 4, the retaining member 24 (see FIGS. 1 and 4) made out of electrical insulation is located between the slip rings 19, 20 in the first embodiment of the present invention. However, a short circuit between the slip rings 19 and 20 may be caused by the abrasion powder (conductive material) produced by the abrasion of the brushes 22, 23.

Figure 19:
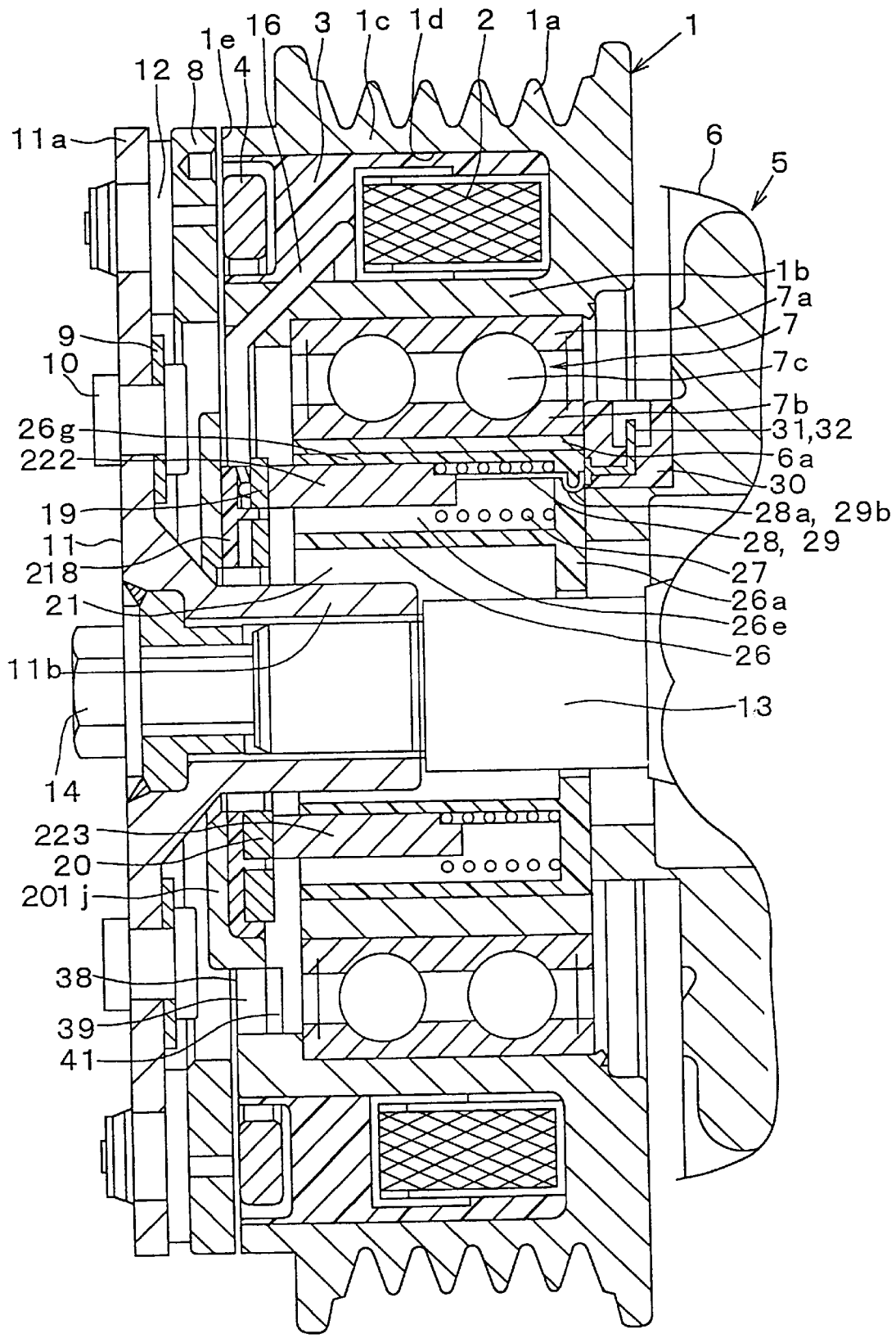
FIG. 19 is a longitudinal sectional view of an electromagnetic clutch taken along line XIX—XIX—XIX of FIG. 20A according to a seventh embodiment of the present invention.
Figure 20A:
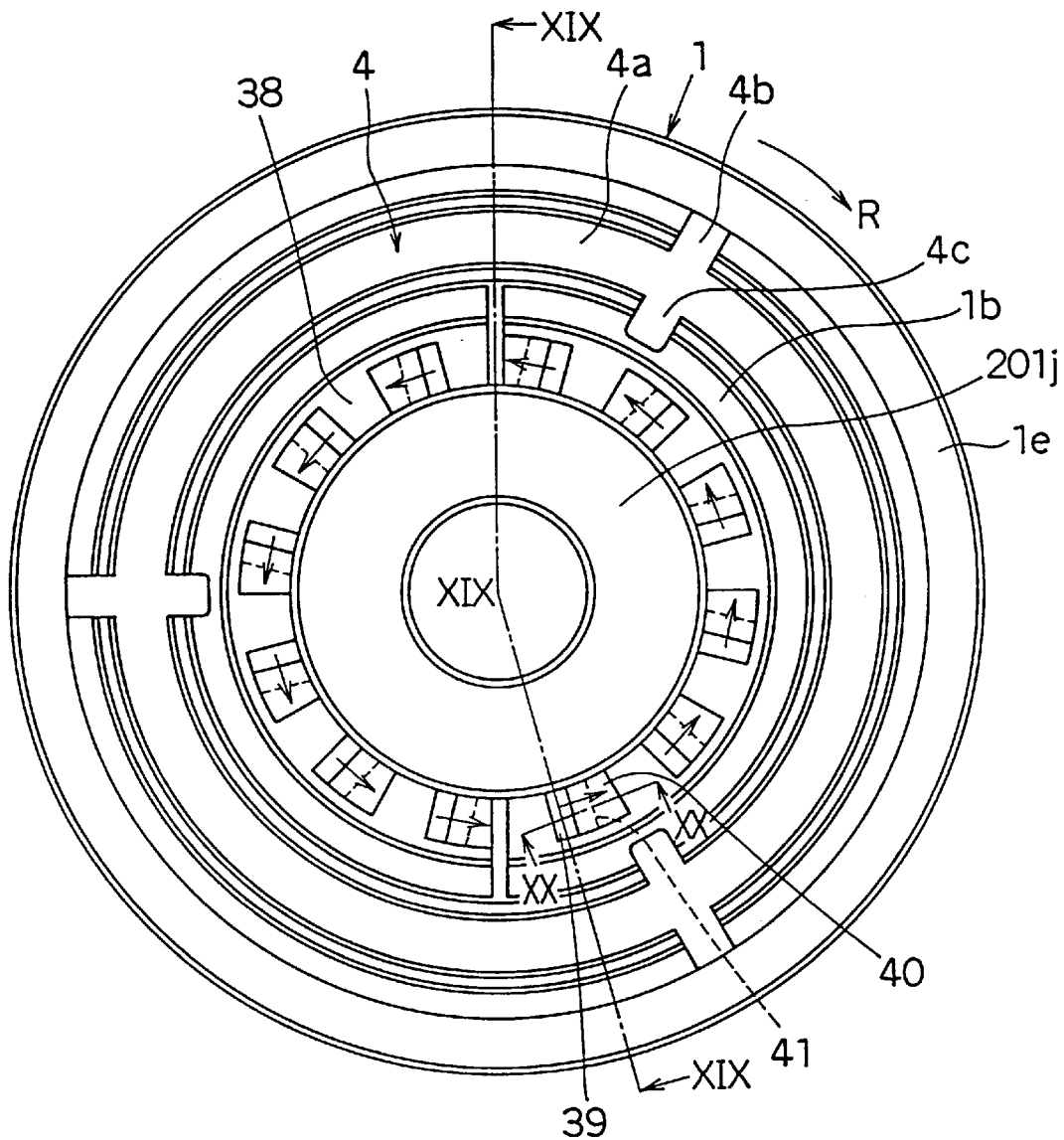
FIG. 20A is a front view of a rotor of the electromagnetic clutch according to the seventh embodiment of the present invention.
Figure 20B:
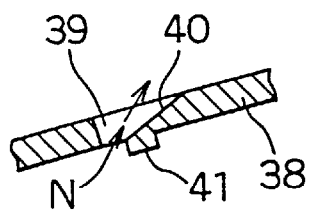
FIG. 20B is a part-sectional view taken along line XX—XX of FIG. 20A according to the seventh embodiment of the present invention.

A seventh embodiment of the present invention, which is made in light of the foregoing problem, prevents the short circuit between the slip rings caused by the brush abrasion powder. FIG. 19 is a longitudinal sectional view taken along line XIX—XIX—XIX of FIG. 20A. As shown in FIGS. 20A, 20B, ventilation openings 39, tapered surfaces 40 which are formed such that the tapered surfaces 40 face the ventilation openings 39, and vane portions 41 for ventilation are formed at ring-shaped connecting portions 38, which are in turn located between the inner cylindrical portion 1b and the inner projection 201j.

In the seventh embodiment, twelve ventilation openings 39 are formed along the circumferential direction at the even intervals. The tapered surface 40 and the vane portion 41 for ventilation are located behind the ventilation opening 39 in the rotational direction R (FIG. 20A) of the rotor 1. As shown in FIGS. 19 and 20B, the vane portion 41 protrudes inwardly from the inner surface of the connecting portion 38, and has a shape of a narrow protrusion which extends along the radial direction of the rotor 1.

According to the seventh embodiment of the present invention, when the rotor 1 rotates in the direction of the arrow 15 R, the vane portion 41 for ventilation also rotates in the same direction. Therefore, air ahead of the vane portion 41 in the rotational direction (left side in FIG. 20B) is pressurized by the shape of the protrusion of the vane 41. The pressurized air ahead of the vane portion 41 in the rotational direction flows into the ventilation opening 39, whose pressure is lower than the pressurized air, as shown by directional arrow N in FIG. 20B, and flows out smoothly toward the outside of the rotor 1 along the tapered surface 40.

Such air flow from the inside to the outside of the rotor 1 also produces an air flow around the contact portions between the slip rings 19, 20 and the brushes 222, 223 for discharging the brush abrasion powder with the air flow. Therefore, a short circuit condition between the slip rings 19 and 20 caused by the brush abrasion powder is prevented.

Eighth Embodiment

Figure 21:
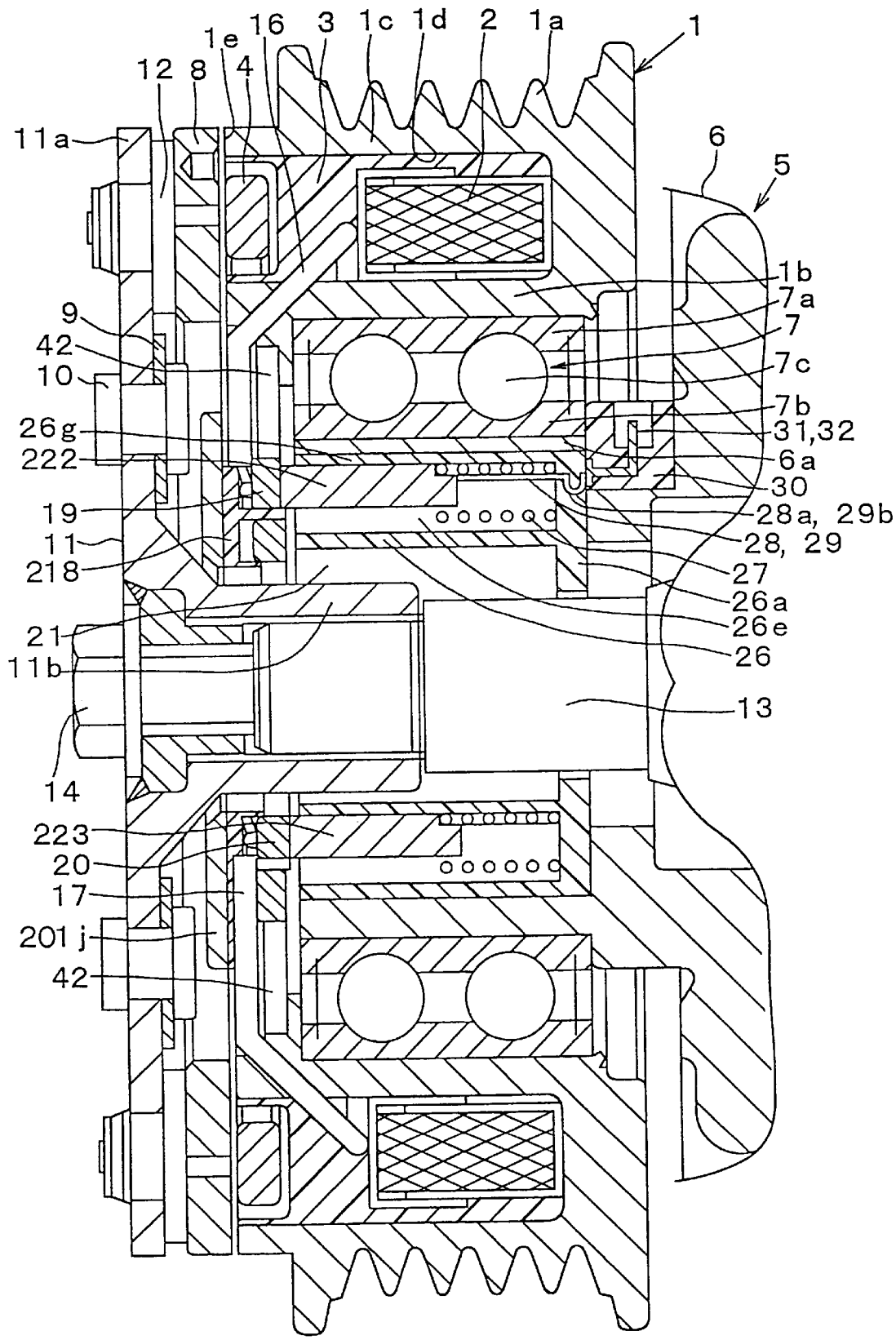
FIG. 21 is a longitudinal sectional view of an electromagnetic clutch according to an eighth embodiment of the present invention.

An eighth embodiment of the present invention is also made in light of the same problem as the seventh embodiment to prevent a short circuit condition between the slip rings 19 and 20 caused by the brush abrasion powder. In the eighth embodiment, a gap 42 is formed between the inner circumference of the inner cylindrical portion 1b and the outer circumference of the slip rings 19, 20 as shown in FIG. 21, such that the brush abrasion powder produced at the slip rings 19, 20 is collected and retained in the gap 42 by centrifugal force.

According to the eighth embodiment of the present invention, the deposit of the brush abrasion powder at the slip rings 19, 20 becomes difficult. Therefore, the short circuit between the slip rings 19 and 20 caused by the brush abrasion powder is prevented.

Ninth Embodiment

Figure 22:
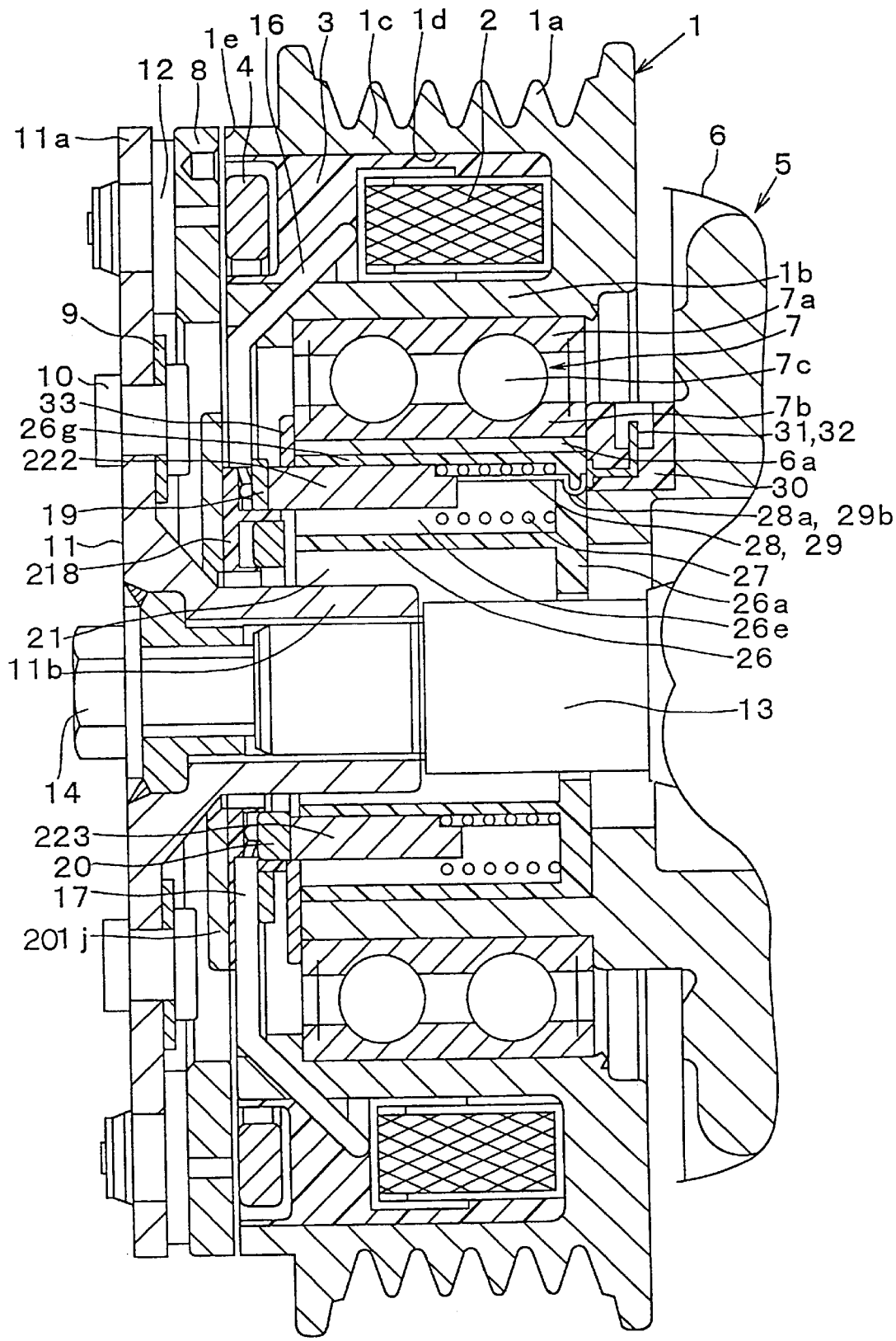
FIG. 22 is a longitudinal sectional view of an electromagnetic clutch according to a ninth embodiment of the present invention.

A ninth embodiment of the present invention is also made in light of the same problem as the seventh and eighth embodiments to prevent the short circuit between the slip rings 19 and 20 caused by the brush abrasion powder. In the ninth embodiment, contact portions between the slip rings 19, 20 and the brushes 222, 223 are shifted in the opposite direction along the axial direction as shown in FIG. 22.

Specifically, the contact portion between the outer slip ring 19 and the brush 222 is located at the left side (forward side in the axial direction), and the contact portion between the inner slip ring 20 and the brush 223 is located at the right side (rearward side in the axial direction).

Since the outer circumferential contact portion and the inner circumferential contact portion are located opposite each other in the axial direction, these contact portions are isolated. Therefore, a short circuit condition between the slip rings 19 and 20 caused by the brush abrasion powder is prevented.

Conversely, it is possible to locate the contact portion between the outer slip ring 19 and the brush 222 at the right side (rearward side in the axial direction) and to locate the contact portion between the inner slip ring 20 and the brush 223 at the left side (forward side in the axial direction).

Other Modifications

In the second through fourth embodiments of the present invention, the shapes of the brushes 222, 223 may be modified to other shapes, such as an elongated cylindrical shape, and the locations of the brushes 222, 223 may be freely determined instead of limiting the locations at the 180° symmetrical locations.

In each embodiment of the present invention, the brushes 22, 23, 222, 223 are held at the boss 6a side, and the slip rings 19, 20 are held at the rotor 1 side. Conversely, it is possible to hold the brushes 22, 23, 222, 223 at the rotor 1 side and to hold the slip rings 19, 20 at the boss 6a side.

In each embodiment of the present invention, the coil-rotation type electromagnetic clutch, which employs the electromagnetic coil 2 in the drive side rotor 1 (drive side rotational member) integrally having the pulley 1a, is disclosed. However, different types of the coil-rotation type electromagnetic clutch may be applicable. For instance, a coil-rotation type electromagnetic clutch, which has an electromagnetic coil 2 located in the hub 11 (slave side rotational member) connected to the drive shaft 13 of the compressor 5 (rotational equipment), having the armature 8 which is connected to the drive side rotor 1 via the leaf spring 9 (elastic connecting member) may be applicable. The armature 8 in this type of clutch is attracted to the hub 11 by the electromagnetic attractive force of the electromagnetic coil 2, and the rotation of the drive side rotor 1 is transmitted to the drive shaft 13 via the armature 8 and the hub 11.

In each embodiment of the present invention, it is possible to switch the locations of the anode and the cathode, conversely, at the current supply passage to the electromagnetic coil 2 shown in the drawings.

Further, it is possible to modify the concrete structure of the current supply passage to the electromagnetic coil 2 according to the specification of the electromagnetic clutch without limiting the structure to the one disclosed in the drawings.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An electromagnetic clutch comprising:
   a stationary boss;
   a drive shaft located within said stationary boss;
   a rotating member that is rotated by the rotational force and that is rotationally supported on an outer circumferential surface of said boss;
   an electromagnetic coil that is mounted on the rotating member and that is electrically insulated from the rotating member for generating an electromagnetic attractive force when a current is supplied thereto;
   an armature that is coupled to the rotating member in response to the electromagnetic attractive force generated by the electromagnetic coil, whereby the rotational force is transmitted from the rotating member to the drive shaft via the armature; and
   a sliding current supply mechanism having a slip ring and a brush, one of which is supported by the rotating member and the other of which is supported by the boss and which are slidable to selectively contact each other to supply the current to the electromagnetic coil, said sliding current supply mechanism being located in a space between the boss and the drive shaft; wherein
   said slip ring defines one of a convex and a concave surface and said brush defines the other of said convex and said concave surface, said concave and convex surface contacting each other to provide a substantially full surface contact to cause the slip ring and the brush to maintain a constant contact area.

2. An electromagnetic clutch according to claim 1, further comprising:
   an inner projection provided on the rotating member and that extends toward an inner circumference of the boss for retaining the slip ring;
   a bearing for rotatably supporting the rotating member on an outer surface of the boss;
   a groove formed on the boss; and
   a circlip having a substantial rectangular shape whose longitudinal direction is perpendicular to an axial direction of the boss, said circlip being latched to the boss at the groove to axially position the bearing, wherein:
   said rotating member defines an insert hole through which the circlip passes.

3. An electromagnetic clutch according to claim 1, wherein:
   said rotating member further includes a vane portion for generating an air flow around a contact portion between the slip ring and the brush, and a ventilation opening for ventilating the air flow generated by the vane portion.

4. An electromagnetic clutch for selectively transmitting a rotational force from a rotational power generating source to a drive shaft of an equipment to be driven, said drive shaft being located in a stationary boss extended from a housing of the equipment, said electromagnetic clutch comprising:
   a drive-side rotating member that is rotated by the rotational force, and that is adapted to be rotationally supported on an outer circumferential surface of the boss;
   an electromagnetic coil that is mounted on the drive-side rotating member and that is electrically insulated for generating an electromagnetic attractive force when a current is supplied thereto;
   a slave-side rotating member adapted to be connected to the drive shaft;
   an armature coupled with the drive-side rotating member in response to the electromagnetic attractive force generated by the electromagnetic coil;
   a connecting member for connecting the slave-side rotating member and the armature; and
   a sliding current supply mechanism having a slip ring and a brush, one of which is supported by the drive-side rotating member and the other of which is adapted supported by the boss, and which slidably contact each other to supply the current to the to be electromagnetic coil, said sliding current supply mechanism adapted to be located in a space between the boss and the drive shaft.

5. An electromagnetic clutch according to claim 4, wherein:
   said slip ring is supported by the drive-side rotating member; and
   said brush is adapted to be supported by the boss.

6. An electromagnetic clutch according to claim 5, further comprising:
   a lead for electrically connecting the electromagnetic coil and the slip ring; and
   an electrically insulative retaining member connected to the drive-side rotating member and being adapted to retain the slip ring and the lead at a space between the drive-side rotating member and the drive shaft.

7. An electromagnetic clutch according to claim 5, further comprising:
   an elastic bias member adapted to be provided between the boss and the drive shaft for elastically biasing the brush into contact with the slip ring; and
   a lead which is electrically connected to the brush and is adapted to be provided between the boss and the drive shaft.

8. An electromagnetic clutch according to claim 7, further comprising:
   an electrically insulative connector adapted to be supported by the housing; and
   a terminal provided on the connector and connected to the lead.

9. An electromagnetic clutch according to claim 5, further comprising:
   an electrically insulative retaining member adapted to be fixed on an inner periphery of the boss and having a brush accommodation space, wherein:
   said brush is adapted to be shaped to correspond to a partial circumference of the boss to accommodate said brush.

10. An electromagnetic clutch according to claim 4, wherein:

said connecting member is made out of an elastic material.

11. An electromagnetic clutch according to claim 4, wherein:
said slip ring and said brush contact on a curved surface to maintain an approximately constant contact area between the slip ring and the brush.

12. An electromagnetic clutch according to claim 4, wherein:
said drive-side rotating member further includes a vane portion for generating an air flow around a contact portion between the slip ring and the brush, and a ventilation opening for ventilating the air flow generated by the vane portion.

13. An electromagnetic clutch according to claim 4, further comprising:
an inner projection provided on the drive-side rotating member that is adapted to extend to an inner circumference of the boss to retain the slip ring;
a bearing adapted to rotatably support the drive-side rotating member on an outer surface of the boss; and
a circlip having a substantially rectangular shape whose longitudinal direction is adapted to be perpendicular to an axial direction of the boss, said circlip being adapted to be latched to the boss at a groove to axially position the bearing, wherein:
said drive-side rotating member further includes an insert hole through which the circlip passes.

14. A rotational equipment having an electromagnetic clutch comprising:
a drive-side rotating member which is rotated by rotational force;
a housing of an equipment to be driven, having a pipe-shaped boss located in the drive-side rotating member;
a bearing for rotatably supporting the drive-side rotating member on an outer surface of the boss;
an electromagnetic coil mounted on, and electrically insulated from, the drive-side rotating member, said electromagnetic coil generating an electromagnetic attractive force when a current is supplied thereto;
a drive shaft which is located in and extending through a center of the boss;
a slave-side rotating member connected to the drive shaft;
an armature which is coupled with the drive-side rotating member in response to the electromagnetic attractive force generated by the electromagnetic coil;
an elastic connecting member for connecting the slave-side rotating member and the armature; and
a sliding current supply mechanism having a slip ring and a brush, one of which is supported by the drive-side rotating member and the other of which is supported by the boss, and which slidably contact each other to supply the current to the electromagnetic coil, said sliding current supply mechanism being located between the boss and the drive shaft.

15. A rotational equipment according to claim 14, wherein:
said slip ring is supported by the drive-side rotating member; and
said brush is supported by the boss.

16. A rotational equipment according to claim 15, further comprising:
a lead for electrically connecting the electromagnetic coil and the slip ring; and
an electrically insulative retaining member connected to the drive-side rotating member for retaining the slip ring and the lead between the drive-side rotating member and the drive shaft.

17. A rotational equipment according to claim 15, wherein:
said brush is provided on at least a part of the boss in a circumferential direction.

18. An electromagnetic clutch for selectively transmitting a rotational force to a drive shaft of an equipment to be driven, said drive shaft being located in a stationary boss that extends from a housing of the equipment, said electromagnetic clutch comprising:
a rotating member that is rotated by the rotational force;
an electromagnetic coil that is mounted on the rotating member and that is electrically insulated from the rotating member for generating an electromagnetic attractive force when a current is supplied thereto;
an armature that is coupled to the rotating member in response to the electromagnetic attractive force generated by the electromagnetic coil, whereby the rotational force is adapted to be transmitted from the rotating member to the drive shaft via the armature;
a sliding current supply mechanism having a slip ring and a brush, one of which is supported by the rotating member and the other of which is adapted to be supported by the boss, and which are slidable to selectively contact each other to supply the current to the electromagnetic coil, said sliding current supply mechanism being adapted to be located in a space between the boss and the drive shaft;
an inner projection provided on the rotating member and that is adapted to extend toward an inner circumference of the boss for retaining the slip ring;
a bearing adapted to rotatably supported the rotating member on an outer surface of the boss; and
a circlip having a substantial rectangular shape whose longitudinal direction is adapted to be perpendicular to an axial direction of the boss, said circlip being adapted to be latched to the boss at a groove to axially position the bearing, wherein:
said rotating member defines an insert hole through which the circlip passes.

19. An electromagnetic clutch according to claim 18, wherein:
said rotating member further includes a vane portion for generating an air flow around a contact portion between the slip ring and the brush, and a ventilation opening for ventilating the air flow generated by the vane portion.

20. An electromagnetic clutch for selectively transmitting a rotational force to a drive shaft of an equipment to be driven, said drive shaft being located in a stationary boss that extends from a housing of the equipment, said electromagnetic clutch comprising:
a rotating member that is rotated by the rotational force and is adapted to be rotationally supported on an outer circumferential surface of said boss;
an electromagnetic coil that is mounted on the rotating member and that is electrically insulated from the rotating member for generating an electromagnetic attractive force when a current is supplied thereto;
an armature that is coupled to the rotating member in response to the electromagnetic attractive force generated by the electromagnetic coil, whereby the rotational force is adapted to be transmitted from the rotating member to the drive shaft via the armature; and a sliding current supply mechanism having a slip ring and a brush, one of which is supported by the rotating member and the other of which is adapted to be supported by the boss, and which are slidable to selectively contact each other to supply the current to the electromagnetic coil, said sliding current supply mechanism being adapted to be located in a space between the boss and the drive shaft; wherein:

said slip ring defines one of a convex and a concave surface and said brush defines the other of said convex and said concave surface, said concave and convex surfaces contacting each other to provide a substantially full surface contact to cause the slip ring and the brush to maintain a constant contact area.

21. An electromagnetic clutch according to claim 20, wherein:

said rotating member further includes a vane portion for generating an air flow around a contact portion between the slip ring and the brush, and a ventilation opening for ventilating the air flow generated by the vane portion.

* * * * *